United States Patent
Shu et al.

(10) Patent No.: US 6,879,733 B2
(45) Date of Patent: Apr. 12, 2005

(54) IMAGE ARTIFACT REMOVAL TECHNIQUE FOR LCP

(75) Inventors: Joseph Shu, San Jose, CA (US); Jau-Yuen Chen, Palo Alto, CA (US); Tsung-Nan Lin, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 571 days.

(21) Appl. No.: 09/766,122

(22) Filed: Jan. 18, 2001

(65) Prior Publication Data

US 2002/0094128 A1 Jul. 18, 2002

(51) Int. Cl.⁷ .................................................. G06K 9/40
(52) U.S. Cl. ...................... 382/275; 382/261; 382/264; 358/3.26
(58) Field of Search ............................ 358/3.08, 3.26, 358/3.27; 382/260, 261, 262, 264, 275

(56) References Cited

U.S. PATENT DOCUMENTS

| | | | |
|---|---|---|---|
| 4,773,734 A | * | 9/1988 | Inoda .......................... 359/893 |
| 5,231,677 A | | 7/1993 | Mita et al. |
| 5,798,846 A | * | 8/1998 | Tretter ......................... 382/262 |
| 6,160,913 A | * | 12/2000 | Lee et al. .................... 382/176 |
| 6,633,411 B1 | * | 10/2003 | Rao et al. .................... 358/2.1 |

FOREIGN PATENT DOCUMENTS

| | | |
|---|---|---|
| EP | 1 079 601 | 2/2001 |
| JP | 64-60087 | 3/1989 |
| JP | 9-247593 | 9/1997 |

* cited by examiner

Primary Examiner—Vikkram Bali
Assistant Examiner—Colin LaRose
(74) Attorney, Agent, or Firm—Michael T. Gabrik

(57) ABSTRACT

A technique is provided that identifies screen and non-screen regions of a projected or displayed image to smooth and selectively remove moiré from the screen regions while maintaining sharpness in the non-screen regions. Each pixel in the image is classified as a screen or non-screen pixel and then pixels in a predetermined surrounding area of each pixel are examined to check the classification of that pixel. A low pass filter is applied to pixels in the image, such that, when the low pass filter is applied, a center of the low pass filter is selectively shifted relative to a current pixel based on the examination.

15 Claims, 4 Drawing Sheets

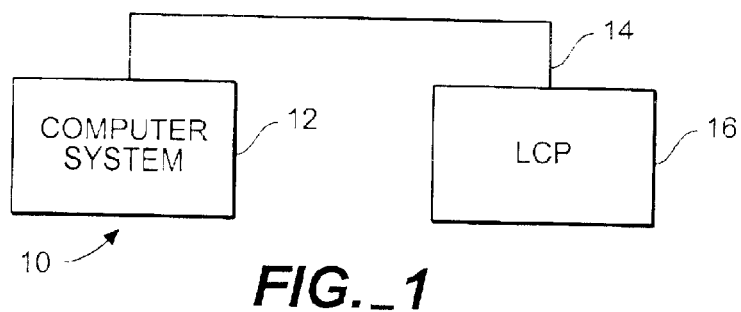
FIG._1
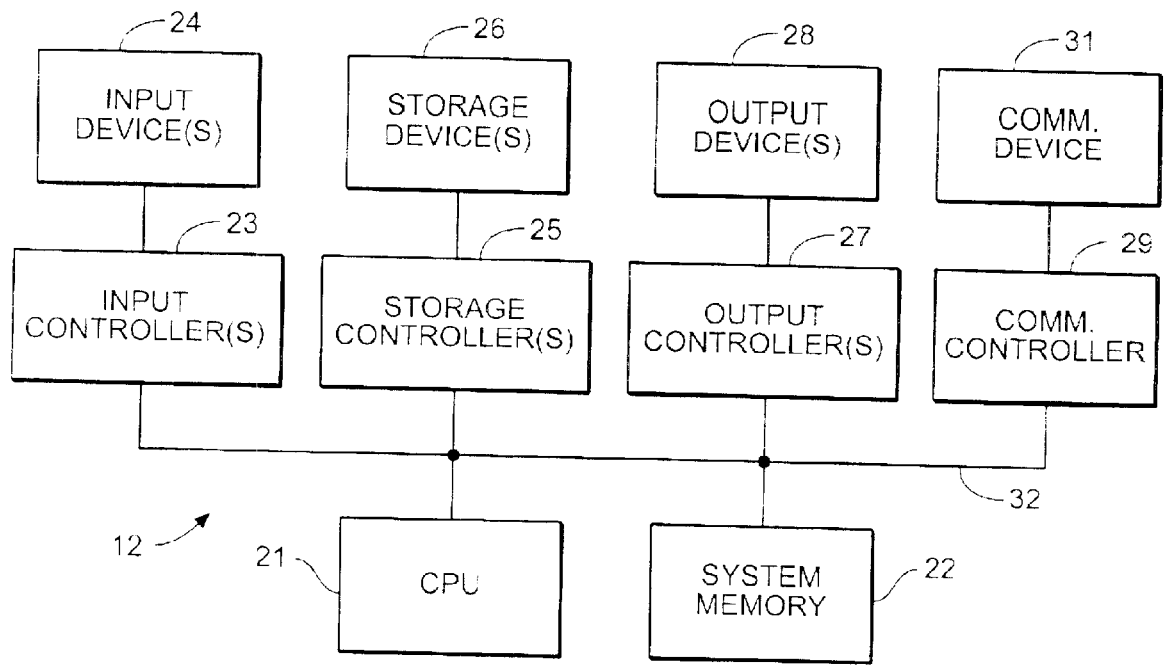
FIG._2
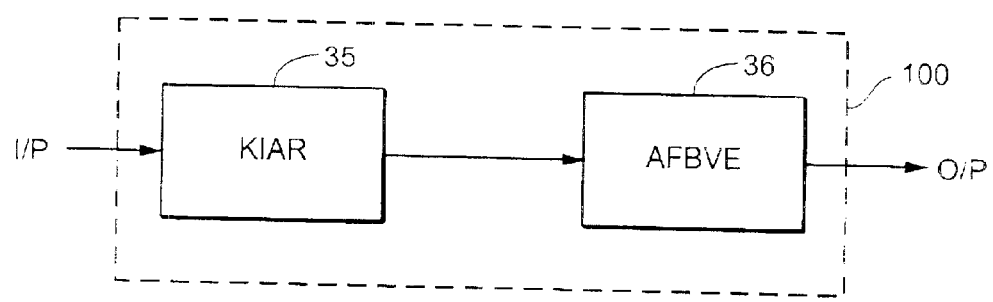
FIG._3

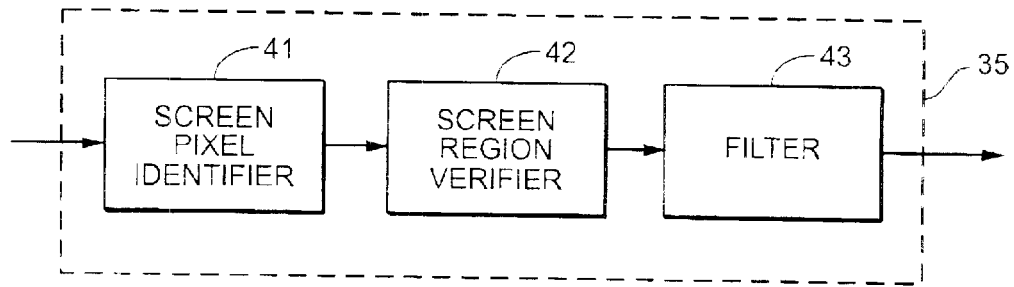
FIG._4
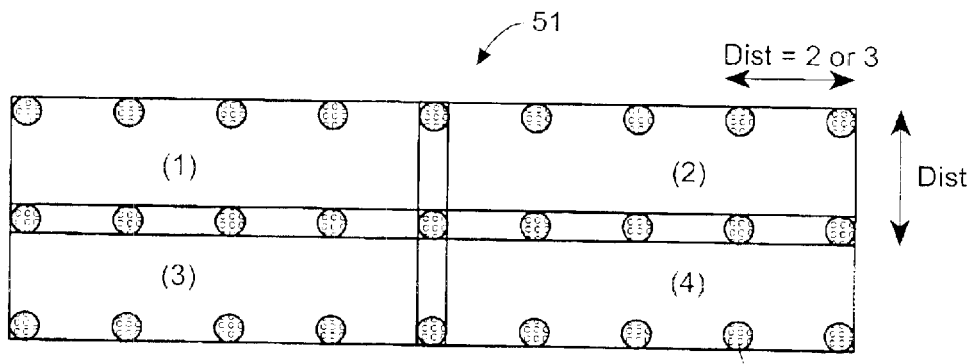
FIG._5
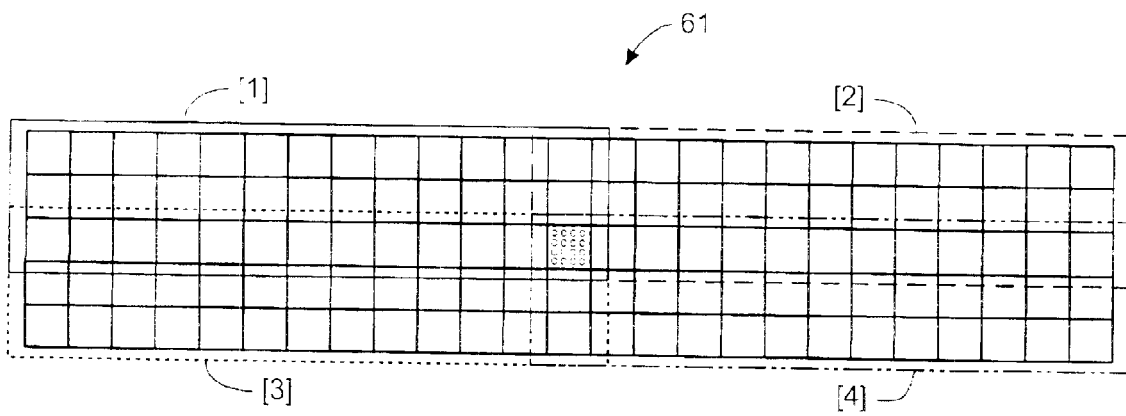
FIG._6

$1/16*$ 
[matrix shown in FIG. 7]
FIG._7
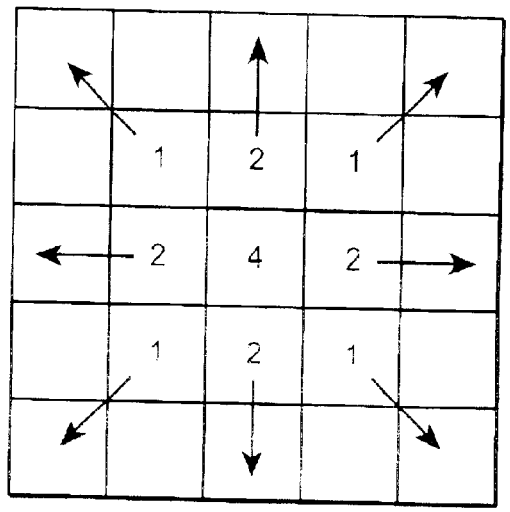
FIG._8
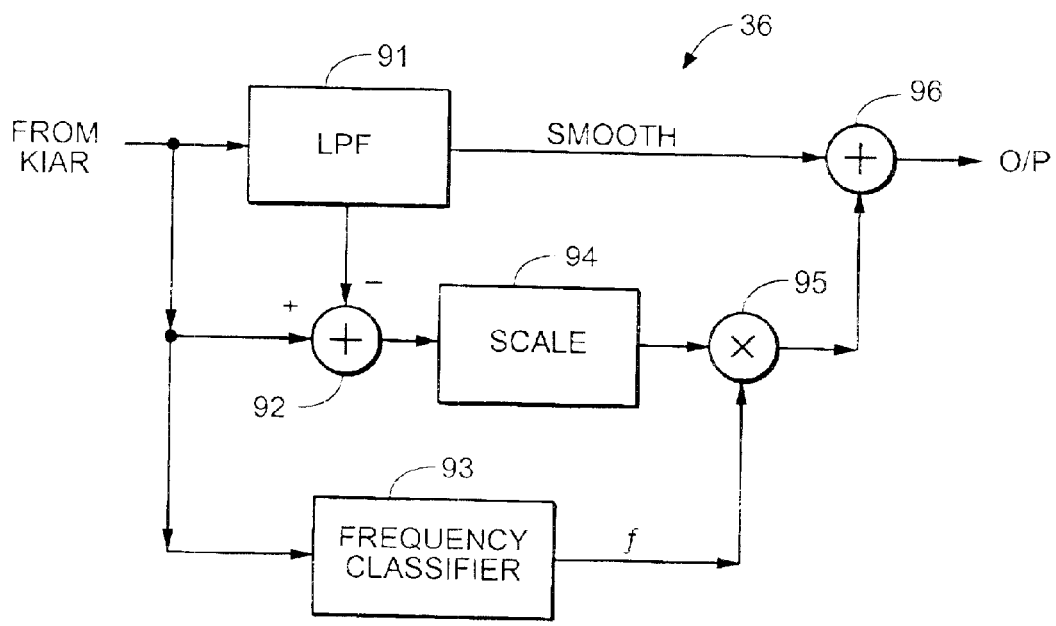
FIG._9

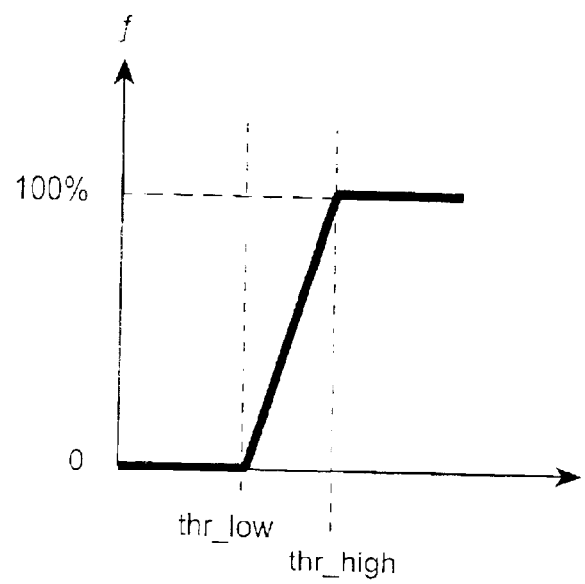
FIG._10
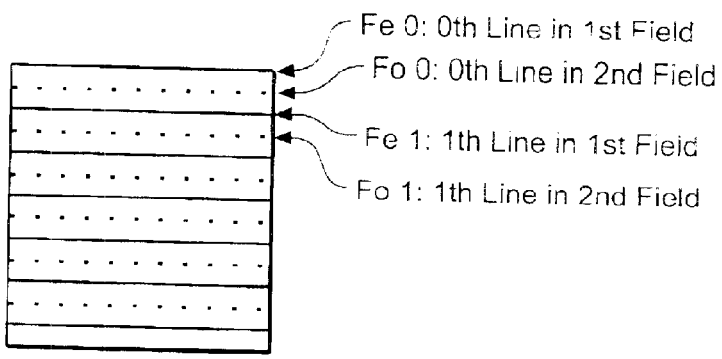
FIG._11A
| $X_{i-1, j-1}$ | $X_{i-1, j}$ | $X_{i-1, j+1}$ |
|---|---|---|
| $X_{i, j-1}$ | $X_{i, j}$ | $X_{i, j+1}$ |
| $X_{i+1, j-1}$ | $X_{i+1, j}$ | $X_{i+1, j+1}$ |
X Either All From Fe or All From Fo
FIG._11B ure: IMAGE ARTIFACT REMOVAL TECHNIQUE FOR LCP

CROSS-REFERENCE TO RELATED APPLICATIONS

This application is related to application entitled "Memory Efficient Image Artifact Removal Technique for LCP," filed herewith in names of inventors Jau-Yuen Chen and Joseph Shu and assigned to the assignee of this application. The contents of the above-identified related application are incorporated by reference herein.

BACKGROUND OF THE INVENTION

1. Field of the Invention

This invention relates to a method and apparatus for removing image artifacts including moiré from screen images, particularly images generated by liquid crystal projectors (LCPs). The invention also relates to a program of instructions for implementing various aspects of the image artifact removal technique.

2. Description of the Related Art

An image that contains screens, which are composed of periodic lines or dot patterns, sometimes exhibits artifacts including moiré artifacts when projected or displayed. Moiré artifacts may result whenever two geometrically-regular patterns are superimposed and often manifests itself as a ripple-like pattern in the image representations. Such artifacts degrade image quality and are therefore undesirable.

In the case of a projected image, the image-generating projection device (e.g., an LCP) may employ a technique known as a "keystone correction" which alters the shape of the projected image to compensate for the angle of projection. While the keystone correction improves certain characteristics of the projected image, it has a disadvantage in that it is usually not able to maintain equal spacing between screen line/dot patterns. Consequently, the unequal spacing at different locations in the image results in moire artifacts.

While low pass filtering may be used to remove the moiré artifacts, global application of a low pass filter (LPF) tends to cause blurring in text and non-screen regions in the displayed or projected image. That is, if an LPF is applied uniformly to the image, the degree of filtering required to achieve an acceptable reduction in moiré usually results in an unacceptable reduction in resolution.

Thus, there is a need for an effective image artifact removal technique that smoothes screen regions to remove moire while maintaining sharpness in non-screen regions and that is particularly well suited for projected images.

OBJECTS AND SUMMARY OF THE INVENTION

Objects of the Invention

Therefore, it is an object of the present invention to overcome the aforementioned problems by providing such an image artifact removal technique.

It is another object of this invention to provide an image artifact removal technique that identifies and segments screen and non-screen image regions and treats the two regions separately to remove moire from the screen regions while maintaining sharpness in the non-screen regions.

Summary of the Invention

According to one aspect of this invention, a method for removing image artifacts from an image representation is provided. Such method comprises the steps of (a) obtaining a pixel representation of the image; (b) classifying each pixel in the image as a screen or non-screen pixel; (c) examining pixels in a predetermined surrounding area of each pixel to check the classification of that pixel as determined in step (b); and (d) selectively applying a low pass filter to pixels in the image, such that, when the low pass filter is applied, a center of the low pass filter is selectively shifted relative to a current pixel based on the examining in step (c).

Various preferred features of the method are set forth below.

The classifying step (b) comprises applying a first mask of a predetermined size centered on the pixel being classified to determine if the center pixel is in an area having a predetermined periodic pattern.

The first mask is divided into a plurality of overlapping areas, the center pixel being in each of the first mask areas.

The examining step (c) comprises applying a second mask of a predetermined size centered on the pixel being checked.

The second mask is divided into a plurality of overlapping areas, the center pixel being in each of the second mask areas.

The predetermined periodic pattern is a periodic line or dot pattern having a period of 2 or 3.

The selectively applying step (e) comprises selectively applying the low pass filter based on which of the plurality of second mask areas contains screen pixels.

The above-described method may further comprise the steps of (f) determining a feature indicator for at least one portion of the image; and (g) adaptively sharpening or softening the at least one portion of the image based on the determined feature indicator.

Another aspect of the invention involves an apparatus for removing image artifacts from a representation of an image. Such apparatus comprises a device for obtaining a pixel representation of the image; a screen pixel identifier, in communication with the device, for classifying each pixel in the image as a screen or non-screen pixel; a screen region verifier, in communication with the screen pixel identifier, for examining pixels in a predetermined surrounding area of each pixel to check the classification of that pixel as determined by the screen pixel identifier; and a low pass filter, in communication with the screen region verifier, that is selectively applied to pixels in the image, such that, when the low pass filter is applied, a center of the low pass filter is selectively shifted relative to a current pixel based on the examining.

Various preferred features of the apparatus are set forth below.

The screen pixel identifier comprises a first mask of a predetermined size that is applied by centering the first mask on the pixel being classified to determine if the center pixel is in an area having a predetermined periodic pattern.

The first mask is divided into a plurality of overlapping areas, the center pixel being in each of the first mask areas.

The screen region verifier comprises a second mask of a predetermined size that is applied by centering the second mask on the pixel being checked.

The second mask is divided into a plurality of overlapping areas, the center pixel being in each of the second mask areas.

The predetermined periodic pattern is a periodic line or dot pattern having a period of 2 or 3.

The low pass filter is selectively applied based on which of the plurality of second mask areas contains screen pixels.

The apparatus described above may further comprise a frequency classifier that determines a feature indicator for at least one portion of the image; and an image processor for adaptively sharpening or softening the at least one portion of the image based on the determined feature indicator.

In accordance with further aspects of the invention, the above-described method or steps thereof may be embodied in a program of instructions (e.g., software) which may be stored on, or conveyed to, a computer or other processor-controlled device for execution. Alternatively, the method or steps thereof may be implemented using hardware or a combination of software and hardware.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 1 is a block diagram illustrating major components in an image projection system that is suitable for carrying out various aspects of the present invention;

FIG. 2 is a block diagram illustrating components in a typical computer system that is suitable for carrying out various aspects of the invention;

FIG. 3 is a functional block diagram showing the process flow and the relationship between the keystone image artifact removal (KIAR) and the adaptive field-based video enhancement (AFBVE) operations;

FIG. 4 is a functional block diagram of the KIAR technique according to embodiments of the invention;

FIG. 5 is a schematic diagram of a screen pixel identifier (SPI) mask according to embodiments of the invention;

FIG. 6 is a schematic diagram of a screen region verifier (SRV) mask according to embodiments of the invention;

FIG. 7 is a schematic representation of a 3×3 Gaussian LPF kernel used in embodiments of the invention;

FIG. 8 is a schematic representation showing the shift of the LPF kernel according to the SRV processing;

FIG. 9 is a functional block diagram of the AFBVE technique according to embodiments of the invention;

FIG. 10 is a graphical representation of the value of a feature indicator produced by a frequency classifier of the AFBVE operation as a function of Sobel edge detector output;

FIG. 11A is a graphical representation of an interlaced input image; and

FIG. 11B is a schematic representation showing how a filter kernel, such the LPF kernel shown in FIG. 7, is applied to interlaced image data.

DESCRIPTION OF THE PREFERRED EMBODIMENTS

FIG. 1 illustrates components in a typical image projection system 10 in which the techniques of the present invention can be employed. In the illustrated embodiment, a computer system 12, stores digital images that are electrically transmitted along a suitable transmission path 14 to a projecting device 16, such as a liquid crystal projector (LCP) which projects such images onto a screen, wall or other display area. As will be appreciated by those skilled in the art, FIG. 1 represents just one of many alternatives available for obtaining digital images and projecting them. The present invention concerns certain processing applied to the digital images before they are displayed or projected, and for the purpose of this invention, it is not important how or where the images are stored or digitized. Digital images to be processed in accordance with the invention may be obtained from scanners, digital cameras, etc., stored in a memory, and transmitted to the projecting device. Such digital images may also be computer generated. Moreover, the special processing which is the subject of the present invention may occur either in the projecting device itself, or in a computer or other device capable of performing the processing of the invention prior to transmission of the processed image data to the projecting device.

In the case where digitized images are obtained, stored and processed by computer 12, such computer may be of any suitable type, including a personal computer or workstation. As illustrated in FIG. 2, the computer typically includes a central processing unit (CPU) 21 that provides computing resources and controls the computer. CPU 21 may be implemented with a microprocessor or the like, and may also include a graphics processor and/or a floating point coprocessor for mathematical computations. Computer 12 further includes system memory 22 which may be in the form of random-access memory (RAM) and read-only memory (ROM).

A number of controllers and peripheral devices are also provided, as shown in FIG. 2. Input controllers 23 represents an interface to one or more input devices 24, such as a keyboard, mouse or stylus. Computer system 12 may also have input controllers for connecting an input device such as a scanner and/or digital camera from which digital images may be obtained. A storage controller 25 is an interface to a storage device 26 that includes a storage medium such as magnetic tape or disk, or an optical medium that may be used to record programs of instructions for operating systems, utilities and applications which may include embodiments of programs that implement various aspects of the present invention. Storage device 26 may also be used to store image data to be processed in accordance with the invention. Output controllers 27 provide interfaces to output devices 28 such as a display device which may be a cathode ray tube (CRT) or thin film transistor (TFT) display. An output controller is also provided for connecting projecting device 16 to computer 12. Communications controller 29 interfaces with communication device 31 which may be a modem or other network connection. Programs that implement various aspects of this invention and/or processed or to be processed image data may be transmitted to computer 12 from a remote location (e.g., a server) over a network.

In the illustrated embodiment, all major system components connect to bus 32 which may represent more than one physical bus. For example, some personal computers incorporate only a so-called Industry Standard Architecture (ISA) bus. Other computers incorporate an ISA bus as well as a higher bandwidth bus.

FIG. 3 illustrates a processor 100, which may be embodied in computer 12, in the projecting device 16, or other suitable device, for performing various functions, including keystone image artifact removal (KIAR) 35 and adaptive field-based video enhancement (AFBVE) 36 which KIAR is designed to support. The relationship between KIAR and AFBVE is illustrated in the figure. The input image (I/P) is transmitted to the KIAR block where it is processed in accordance with the KIAR technique. The KIAR processed image is then transmitted to the AFBVE block where it may be further processed in accordance with the AFBVE technique to generate an output image (O/P) that is displayed by LCP 16.

The KIAR and AFBVE functions may be implemented in processor 100 in a variety of ways including by software, hardware, or combination thereof. Such software, for example, may be stored on computer 12 in system memory 22 or in storage device 26, and fetched by CPU 21 for execution. More broadly, such software may be conveyed by any of a variety of machine-readable medium including magnetic tape or disk, optical disc, signals transmitted through network paths including the Internet, as well as other suitable carrier signals throughout the electromagnetic spectrum including infrared signals. Processor 100 may also be implemented with discrete logic circuits, one or more application specific integrated circuits (ASICs), digital signal processors, program-controlled processors, or the like.

FIG. 4 is a functional block diagram of the KIAR technique in accordance with embodiments of the invention. In one embodiment, KIAR 35 is implemented with a screen pixel identifier (SPI) 41, a screen region verifier (SRV) 42 and a filter 43 such as a low pass filter (LPF). The process flow is as shown in the figure. SPI 41 examines each pixel of a digital image input to KIAR block 35 and classifies that pixel as either a screen or non-screen pixel. For each pixel, SRV 42 then examines surrounding area pixels to check if the initial classification was correct and to reclassify any pixels misclassified by SPI 41. A LPF is then applied to screen region pixels, as described below, while keeping the non-screen region pixels unchanged.

SPI 41 employs a mask 51, schematically illustrated in FIG. 5, to perform its classification function. In a preferred embodiment, mask 51 has a size of 25×7 pixels and is centered on the pixel currently being examined, as illustrated in FIG. 5. The mask elements 52 are spaced so as to check if the center pixel is in a periodic line or dot pattern area, where the period or distance (dist) between pixels corresponding to adjacent mask elements is equal to some predetermined number. In a preferred embodiment, the mask elements 52 are spaced so that predetermined number is 3. That is, there are two pixels between each pixel that corresponds to a mask element and that is examined. In another embodiment, mask 51 may also be sized such that dist=2, that is, every other pixel is examined.

As illustrated in FIG. 5, mask 51 is divided into overlapping quadrants, denoted (1), (2), (3) and (4). Such division is done to facilitate the identification of screen pixels on borders and in corners. In a preferred embodiment, each quadrant covers 13×4 pixels, i.e., a 5×2 cycle of pixels. The right-most column of pixels in quadrant (1) overlap with the left-most column of pixels in quadrant (2), and the bottom row of pixels in quadrant (1) overlap with the top row of pixels in quadrant (3). Similarly, the top row of pixels in quadrant (4) overlap with the bottom row of pixels of quadrant (2), and the left-most column of pixels in quadrant (4) overlap with the right-most column of pixels in quadrant (3). The center pixel is common to each quadrant.

In one embodiment, if all examined pixels in a particular quadrant have the same color values (e.g., RGB values), then that quadrant is considered to be in a screen area with a predetermined screen pattern period corresponding to the SPI mask used. Other pixel attributes, such as luminosity or chrominance, may also be examined for patterns corresponding to the predetermined pattern. If any quadrant is classified as being in a screen area, then the center pixel is considered a screen pixel.

After processing with the SPI mask, whereby all pixels are designated as a screen or a non-screen pixel, any pixel misclassifications are corrected by SRV 42 which also employs a mask, similar to the SPI mask but of different dimensions. Thus, for each pixel, SRV 42 is used to check whether each quadrant contains only screen pixels, that is, if all pixels in a particular quadrant were determined by the SPI mask to be screen pixels. When the SPI mask is 25×7, as shown in FIG. 5, the SRV mask 61 is preferably 25×5 pixels and also divided into quadrants denoted [1], [2], [3] and [4], as illustrated in FIG. 6. Each quadrant is preferably 13×3 pixels with one horizontal and vertical line overlap between adjacent quadrants, as is the case with the SPI mask. Dividing the SRV mask 61 into quadrants allows the SRV to perform accurately both inside screen regions and at the borders and corners of such regions.

A filter kernel of LPF 43 is applied based on the processing with the SRV mask. The filter kernel is preferably a 3×3 Gaussian LPF kernel whose coefficients are shown in FIG. 7. The manner in which the LPF kernel is applied depends on which combination of quadrants of the SRV mask 61 contain screen pixels. If all of the pixels in each of the four quadrants of SRV mask 61 are screen pixels, then the LPF kernel is applied to smooth the center pixel, which is the darkened pixel in FIG. 6. However, in other combinations, the LPF kernel is shifted before it is applied, as illustrated in FIG. 8. If only quadrants [1] and [2] contain screen pixels, the LPF kernel is moved one pixel up. If only quadrants [3] and [4] contain screen pixels, the LPF kernel is moved one pixel down. If only quadrants [1] and [3] contain screen pixels, the LPF kernel is moved one pixel to the left. If only quadrants [2] and [4] contain screen pixels, the LPF kernel is moved one pixel to the right. If only quadrant [1] contains screen pixels, the LPF kernel is moved one pixel diagonally to the upper left. If only quadrant [2] contains screen pixels, the LPF kernel is moved one pixel diagonally to the upper right. If only quadrant [3] contains screen pixels, the LPF kernel is moved one pixel diagonally to the lower left. If only quadrant [4] contains screen pixels, the LPF kernel is moved one pixel diagonally to the lower right. In all other cases, the pixel being examined is left unchanged. That is, the LPF is not applied.

For a pixel (i, j), the LPF process is as follows:

$I_{i/p}$ (i, j)=input image of KIAR operation $I_{lpf}$ (i, j)=3×3 Gaussian LPF with center shifted as shown in FIG. 8

$I_{hpf}$ (i, j)=$I_{i/p}$ (i, j)−$I_{lpf}$ (i, j)

$I_{o/p}$ (i, j)=output image of KIAR operation=$I_{lpf}$ (i, j)+(1+ sharpening factor) *$I_{hpf}$ (i, j)

While the sharpening factor may be experimentally determined for a given LCP system based on the system's hardware characteristics, the inventors have experimentally determined that a value for the term (1+sharpening factor)=1/8. Such a value reduced moiré artifacts in screen areas under all keystone operations on a test image. For non-screen areas, the output image is made to be the same as the input image to maintain non-screen areas of the image.

As previously noted, the KIAR technique may be employed with another technique known as Adaptive Field-Based Video Enhancement (AFBVE). In this case, the KIAR processed image is passed to the AFBVE block for further smoothing or sharpening, as determined by the AFBVE technique. AFBVE is an adaptive process that is used to smooth or sharpen edges or boundaries, as needed, to remove blurring caused by interlaced video input, which is the separate input to the LCP of odd and even image pixel lines. With interlaced video input, usually the odd pixel lines are input first, followed by the even pixel lines. Either way, such an input results in each video frame being comprised of two fields: an odd line field and an even line field. These interaction between these two fields tends to cause blurring in the resulting image. AFBVE is designed to correct this type of blurring.

FIG. 9 is a functional block diagram of the AFBVE technique which adaptively applies sharpening and smoothing to the digital output of the KIAR block 35. The output of KIAR 35 forms the input image, which is interlaced or progressive data, to AFBVE 36. This input image is transmitted to LPF 91, a first summing function 92, and a frequency classifier 93.

LPF 91 low-pass filters the input image to obtain a smooth (i.e., softened image). LPF 91 preferably uses the same 3×3 Gaussian kernel illustrated in FIG. 7. The smoothened image is subtracted from the input image to obtain the high pass frequency components of the image which forms the other input to first summing function 92. Element 92 combines the input image and the high pass frequency components and transmits the result to a scale factor determiner 94 which generates a scaling factor for magnifying the high frequency components of the image. A scaling factor of 1 means that the output image of the AFBVE function is to be the same as the function's input image; a scaling factor greater than 1 means the output image is to be sharpened; and a scaling factor of less than 1 means the output image is to be softened. The inventors have experimentally determined a preferred scaling factor of 1+20/32=52/32.

Rather than simply magnifying the high frequency components by the scaling factor, and then adding them on to the smoothed image to produce the output (O/P) image, the frequency classifier 93 of the present invention produces a feature indicator, denoted by "f" in FIG. 9, to modulate the scaling factor to achieve adaptive sharpening and softening enhancement. Frequency classifier 93 determines which image areas are to be sharpened and which are to be softened and also determines the magnitude of the sharpening or softening factor to be applied at each pixel location in the image. That is, frequency classifier 93 detects image spatial frequency information in order to separate primary edges from noisy micro-edges (or non-edges) to produce the feature indicator, f.

Specifically, frequency classifier 93 uses 3×3 Sobel edge detectors to detect spatial frequency components of the image and classify each component into one of the three regions illustrated in FIG. 10. The three regions are: a softening region which is below a predetermined lower threshold frequency (thr_low), a sharpening region above a predetermined upper threshold (thr_high), and a transition region between the softening and sharpening regions. The transition region provides a smooth transition between softening and sharpening enhancement. As shown in FIG. 10, f is linear in the transition region to avoid discontinuity artifacts between the softening and sharpening regions.

As shown in FIG. 10, feature indicator, f, is a function of the output of the Sobel edge detectors, which has a range of 0–255. The thr_low and thr_high will vary depending on the type of image, personal visual preferences and system hardware characteristics. Such thresholds can be experimentally determined. However, the inventors have determined that for many images a thr_low of about 20 and thr_high of about 40 yields good results.

The feature indicator f, which is number from 0 to 1 (expressed as a percentage between 0 and 100% in FIG. 10), is input to a multiplier 95 where it is multiplied with the scaling factor of scale factor determiner 94 to produce a modulated scaling factor which is applied by a summer 96 to the smoothed image produced by LPF 91. A modulated scaling factor of 1 means that no change is applied to output of LPF 91; a scaling factor greater than 1 means that such output is sharpened; and a scaling factor of less than 1 means that such output is softened or smoothed. The resulting image from summer 96 is the output (O/P) image of the AFBVE process.

FIG. 11A is a graphical representation of an interlaced video image which may be input to an LCP. As previously discussed, in an interlaced image format, each frame contains two fields: a first field which contains, say, all of the odd scan lines and a second field which contains, say, all of the even scan lines. Each image data field is processed separately, for example, the first field is processed followed by the second field. Thus, in the filtering process, a filter kernel is applied to elements from either the first or the second fields, as schematically illustrated in FIG. 11B. It should be noted that the interlaced video format is only one type of video input for an LCP. A progressive format, an image of which has a line-by-line raster format, may also be used.

As the foregoing description demonstrates, the present invention provides a technique (KIAR) for smoothing non-screen image regions to remove moiré therefrom while maintaining sharpness in the non-screen regions. The KIAR process may be followed by an AFBVE process, each of which may be conveniently implemented in a personal computer or other processing device using software, hardware, or combination thereof.

With these implementation alternatives in mind, it is to be understood that the block and flow diagrams show the performance of certain specified functions and relationships thereof. The boundaries of these functional blocks have been arbitrarily defined herein for convenience of description. Alternate boundaries may be defined so long as the specified functions are performed and relationships therebetween are appropriately maintained. The diagrams and accompanying description provide the functional information one skilled in the art would require to fabricate circuits or to write software code to perform the processing required.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for removing image artifacts from a representation of an image, comprising the steps of:
    (a) obtaining a pixel representation of the image;
    (b) classifying each pixel in the image as a screen or non-screen pixel, wherein a screen pixel is defined as a pixel that is part of a predetermined periodic pattern;
    (c) examining pixels in a predetermined surrounding area of each pixel to check the classification of that pixel as determined in step (b) by applying a two-dimensional mask that is divided into a plurality of quadrants, the center of the two-dimensional mask being common to each of the quadrants; and
    (d) selectively applying a low pass filter to pixels in the image, such that, when the low pass filter is applied, a center of the low pass filter is selectively shifted relative to a current pixel based on which of the plurality of quadrants in the two-dimensional mask contains screen pixels as determined in the examining in step (c).

2. The method of claim 1, wherein the classifying step (b) comprises applying a mask that is divided into overlapping areas with the center of the mask being common to each of the areas, the mask being applied such that it is centered on the pixel being classified to determine if the center pixel is part of the predetermined periodic pattern.

3. The method of claim 2, wherein the predetermined periodic pattern is a periodic line or dot pattern having, a period of 2 or 3.

4. The method of claim 1, wherein, in the examining step (c), the two-dimensional mask is applied such that it is centered on the pixel being checked.

5. The method of claim 1, further comprising the steps of:
(e) determining a feature indicator for at least one portion of the image; and
(f) adaptively sharpening or softening the at least one portion of the image based on the determined feature indicator.

6. An apparatus for removing image artifacts from a representation of an image, the apparatus comprising:
a device for obtaining a pixel representation of the image;
a screen pixel identifier, in communication with the device, for classifying each pixel in the image as a screen or non-screen pixel, wherein a screen pixel is defined as a pixel that is part of a predetermined periodic pattern;
a screen region verifier, in communication with the screen pixel identifier, that includes a two-dimensional mask divided into a plurality of quadrants, the center of the two-dimensional mask being common to each of the quadrants, for examining pixels in a predetermined surrounding area of each pixel to check the classification of that pixel as determined by the screen pixel identifier; and
a low pass filter, in communication with the screen region verifier, that is selectively applied to pixels in the image, such that, when the low pass filter is applied, a center of the low pass filter is selectively shifted relative to a current pixel based on which of the plurality of quadrants in the two-dimensional mask contains screen pixels as determined in the examining operation.

7. The apparatus of claim 6, wherein the screen pixel identifier comprises a mask that is divided into overlapping areas with the center of the mask being common to each of the areas and that is applied by centering the mask on the pixel being classified to determine if the center pixel is part of the predetermined periodic pattern.

8. The apparatus of claim 7, wherein the predetermined periodic pattern is a periodic line or dot pattern having a period of 2 or 3.

9. The apparatus of claim 6, wherein the two-dimensional mask is applied by centering it on the pixel being checked.

10. The apparatus of claim 6, further comprising:
a frequency classifier that determines a feature indicator for at least one portion of the image; and
an image processor for adaptively sharpening or softening the at least one portion of the image based on the determined feature indicator.

11. A machine-readable medium embodying a program of instructions for causing a machine to perform a method of removing image artifacts from a representation of an image, the program of instructions comprising instructions for:
(a) obtaining a pixel representation of the image;
(b) classifying each pixel in the image as a screen or non-screen pixel, wherein a screen pixel is defined as a pixel that is part of a predetermined periodic pattern;
(c) examining pixels in a predetermined surrounding area of each pixel to check the classification of that pixel as determined by the classifying instruction (b) by applying a two-dimensional mask that is divided into a plurality of quadrants, the center of the two-dimensional mask being common to each of the quadrants; and
(d) selectively applying a low pass filter to pixels in the image, such that, when the low pass filter is applied, a center of the low pass filter is selectively shifted relative to a current pixel based on which of the plurality of quadrants in the two-dimensional mask contains screen pixels as determined by the result of the examining instruction (c).

12. The machine-readable medium of claim 11, wherein the classifying instruction (b) comprises applying a mask that is divided into overlapping areas with the center of the mask being common to each of the areas, the mask being applied such that it is centered on the pixel being classified to determine if the center pixel is part of the predetermined periodic pattern.

13. The machine-readable medium of claim 12, wherein the predetermined periodic pattern is a periodic line or dot pattern having a period of 2 or 3.

14. The machine-readable medium of claim 11, wherein, in the execution of the examining instruction (c), the two-dimensional mask is applied such that it is centered on the pixel being checked.

15. The machine-readable medium of claim 11, further comprising instructions for:
(e) determining a feature indicator for at least one portion of the image; and
(f) adaptively sharpening or softening the at least one portion of the image based on the determined feature indicator.

* * * * *